United States Patent
Lewis et al.

[15] 3,638,773
[45] Feb. 1, 1972

[54] CLUTCH BRAKE UNIT

[72] Inventors: William E. Lewis, Fairfield; Dennis Dobrinich, Cincinnati, both of Ohio

[73] Assignee: Force Control Industries, Inc., Fairfield, Ohio

[22] Filed: Mar. 31, 1970

[21] Appl. No.: 24,191

[52] U.S. Cl. .......................... 192/18 A, 192/15, 192/113 B
[51] Int. Cl. ............................................. F16d 11/06
[58] Field of Search ............... 192/18 A, 12 C, 113 A, 113 B

[56] References Cited

UNITED STATES PATENTS

| | | | |
|---|---|---|---|
| 1,452,609 | 4/1923 | Klocke | 192/113 A |
| 2,667,954 | 2/1954 | Danly et al. | 192/113 A |
| 3,177,994 | 4/1965 | Jewson | 192/18 A |
| 3,237,738 | 3/1966 | Suppes et al. | 192/113 A |

*Primary Examiner*—Allan D. Herrmann
*Assistant Examiner*—Randall Heald
*Attorney*—Jacox & Meckstroth

[57] ABSTRACT

A clutch-brake unit incorporates a clutch disk pack, and a separate brake disk pack with an interposed piston unit which is coupled in one direction to engage the clutch and in the opposite direction to engage the brake. The housing is formed in three major sections which includes an input section generally enclosing the input shaft and the clutch pack. An output housing generally contains the output shaft and the brake pack, and an intermediate piston housing generally contains the actuated piston and associated fluid pressure inputs. The output shaft is provided with integral impellers and oil access apertures for delivering a constant supply of oil to the clutch and brake packs and for providing an inlet in which the oil may flow by centrifugal force when the output shaft is not turning. A heat exchanger consists of a heat exchange subassembly forming a series of finned tubes which assembly may be inserted in surrounding relation to the clutch pack. A shrouded fan assembly may be substituted where thermal capacity does not require internal cooling.

9 Claims, 9 Drawing Figures

INVENTORS
WILLIAM E. LEWIS &
DENNIS DOBRINICH
BY
Marschal, Biebel, French & Bugg
ATTORNEYS

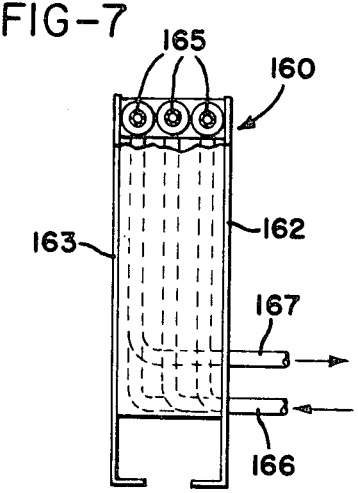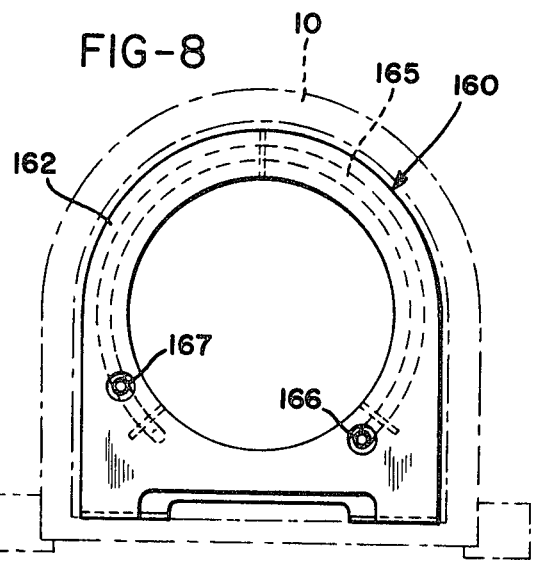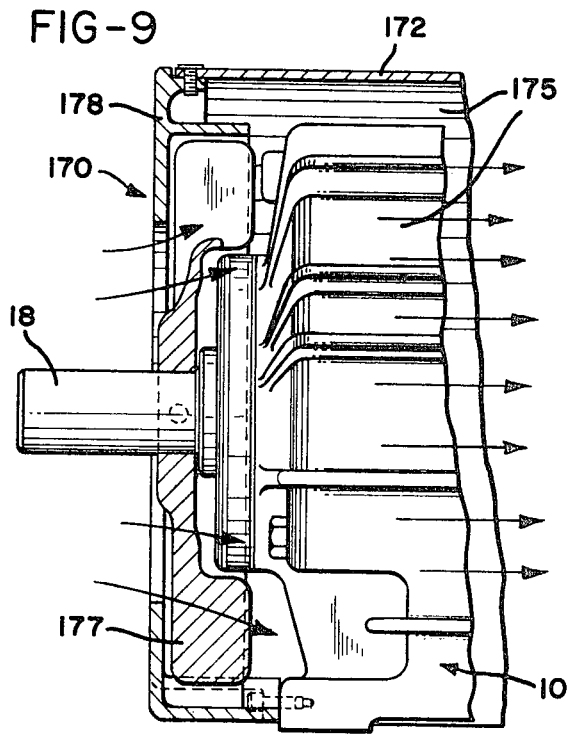

CLUTCH BRAKE UNIT

BACKGROUND OF THE INVENTION

This invention relates generally to the art of clutches and clutch-brake drives for controlling the speed of an output shaft in relation to that of an input shaft. Many prior art devices have been designed and built with oil shear clutch and brake units for this general purpose. However, most of these prior devices have suffered from one or more serious design defects which have limited their usefulness or have substantially increased their cost of manufacture, servicing or maintenance. Thus, many prior devices have been rather seriously limited in their thermal capacity. They have further been limited in the amount of slip, at full load, which could be tolerated without destruction of the clutch pack.

A further but related difficulty resides in the maintenance of such units. It is frequently necessary to replace the disks of the clutch or brake packs particularly where a unit has been operated beyond its rated capacity, or at higher than permitted slip times. Normally this procedure requires complete disassembly of the unit together with the disconnecting, opening up or removal of the piston actuator. Upon reassembly it is thus frequently necessary to replace all of the piston seals and then bleed the system if it is fluid operated.

Although clutch-brake units of the prior art have been designed with integral heat exchangers, the amount of thermal capacity is normally determined when the unit is designed and there has been no ready provision for increasing or substantially altering the thermal capacity either by customer order or in the field after delivery. Further, in spite of efforts to provide high thermal capacity, such clutch-brake units have generally been unable to operate under a constant slip condition at high load due to the inability to provide a sufficient flow of oil between the plates to maintain an oil shear and physically remove generated heat.

SUMMARY OF THE INVENTION

The present invention is directed to an improved clutch-brake unit in which the enumerated objections and difficulties of prior art devices have been met and eliminated. The ease of manufacture and assembly is effected by providing a generally three-piece housing including an inlet housing, an outlet housing, and an intermediate piston housing. The design is such that the piston housing as well as the outlet housing can be preassembled in quantity, thus effecting savings in cost of manufacture. Further, the piston housing is a complete subassembly containing the fluid pressure inlet and outlet openings and thus this important portion of the overall device can be assembled in controlled environmental conditions to prevent contamination of dirt and moisture which would otherwise adversely affect its performance.

The construction of the clutch-brake unit in separate subassemblies has the important advantage of providing for ease of repair and replacement of component parts in the field. If some difficulty should be experienced, for example, with the piston units, the piston housing can be removed in its entirety and a new one inserted while the old one is being disassembled and overhauled, as desired. If for some reason the clutch or brake packs required maintenance, the appropriate portion of the overall device can be removed and ready access is thus afforded to these components while maintaining the integrity of the piston unit.

The above advantages are achieved by utilizing a nonrotating piston unit. This piston unit is positioned axially intermediate the clutch unit and the brake unit so that movement of the piston in one direction serves to engage the clutch and movement in the opposite direction serves to engage the brake. Thus, while the piston is double acting there is no overlap of the clutch and brake in their operation. The nonrotating double-acting piston provides an improvement in response time and also reduces the number of working parts, thus increasing reliability and performance.

The apparatus of the present invention can be operated as a variable speed drive. Thus, it can be constructed only as a clutch unit merely by leaving out the brake stack. The operation at continuous slip is assured not only by a high thermal capacity but by an unusual design of the output shaft which provides a continuous supply of oil to the clutch stack (as well as the brake stack) thus assuring that an adequate supply of oil is at all times provided to maintain a condition of viscous shear and additionally to provide an excess of oil for thermally removing the generated heat. To this end, the output shaft is provided with integrally formed impeller in combination with oil outlet openings through which the oil is fed under positive pressure into the respective clutch and brake stacks while the output shaft is rotating. When the output shaft is not rotating, the clutch is still lubricating by reason of the centrifugal pumping action of alternate disks as they turn through the oil, and the provision of an adequate supply of oil at a location radially inwardly of these disks permits the oil to move freely outwardly. In prior devices, in the absence of oil inlet passageways on the inner shaft, during the stalled condition the oil would have to move against centrifugal force radially inwardly in order to lubricate these plates. Further, to this end, deep radial grooves are formed in alternate plate faces to provide channels through which the oil may readily flow due to the centrifugal pumping action even when the output shaft is stalled or is turning slowly.

The invention further provides for versatility in the selection of thermal capacity. To this end, a heat exchanger subassembly is provided consisting preferably of a number of runs of coiled and finned tubing which may be inserted, either in initial assembly or in the field, in generally surrounding relation to the clutch stack so as to receive the hot oil just as it exits from the stack and to extract the heat therefrom. Further, provision is made for an impeller to be mounted on the input shaft and to direct air over the entire housing through a tubular shroud. Either one of these arrangements can be used, as required.

The arrangement provides versatility in the selection of the mode of operation of the device. Thus, the piston unit can be spring loaded into the braking position to provide a fail-safe unit or, if desired, the position of the springs can be reversed or eliminated altogether, as desired. A single design can be employed to provide a wide variety of thermal capacities by the selection of the heat exchange apparatus desired, thus effecting further economies in manufacture.

The foregoing summary comprises certain of the objects and advantages of the present invention and other such objects and advantages will be apparent from the accompanying drawings, the specification and the appended claims.

BRIEF DESCRIPTION OF THE DRAWINGS

FIG. 7 is a side elevation of a heat exchange used with the clutch-brake unit;

FIG. 8 is an end view of the heat exchanger with the clutch-brake unit housing shown in outline form; and FIG. 9 is a sectional view of the air shroud and fan assembly.

DESCRIPTION OF PREFERRED EMBODIMENT

Figure 1:
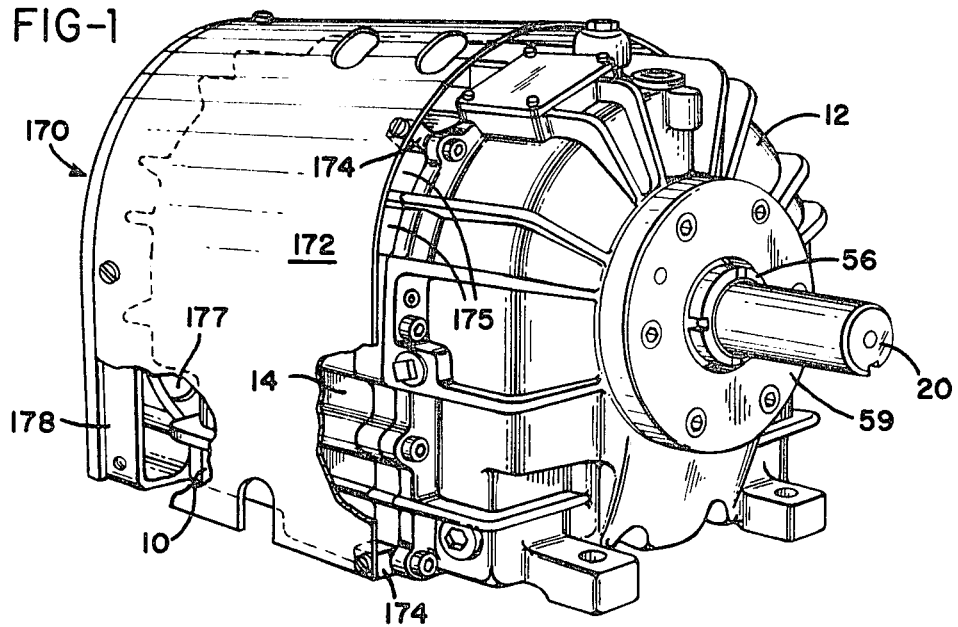
FIG. 1 is a perspective view of a clutch-brake unit according to the present invention showing the air shroud installed.
Figure 2:
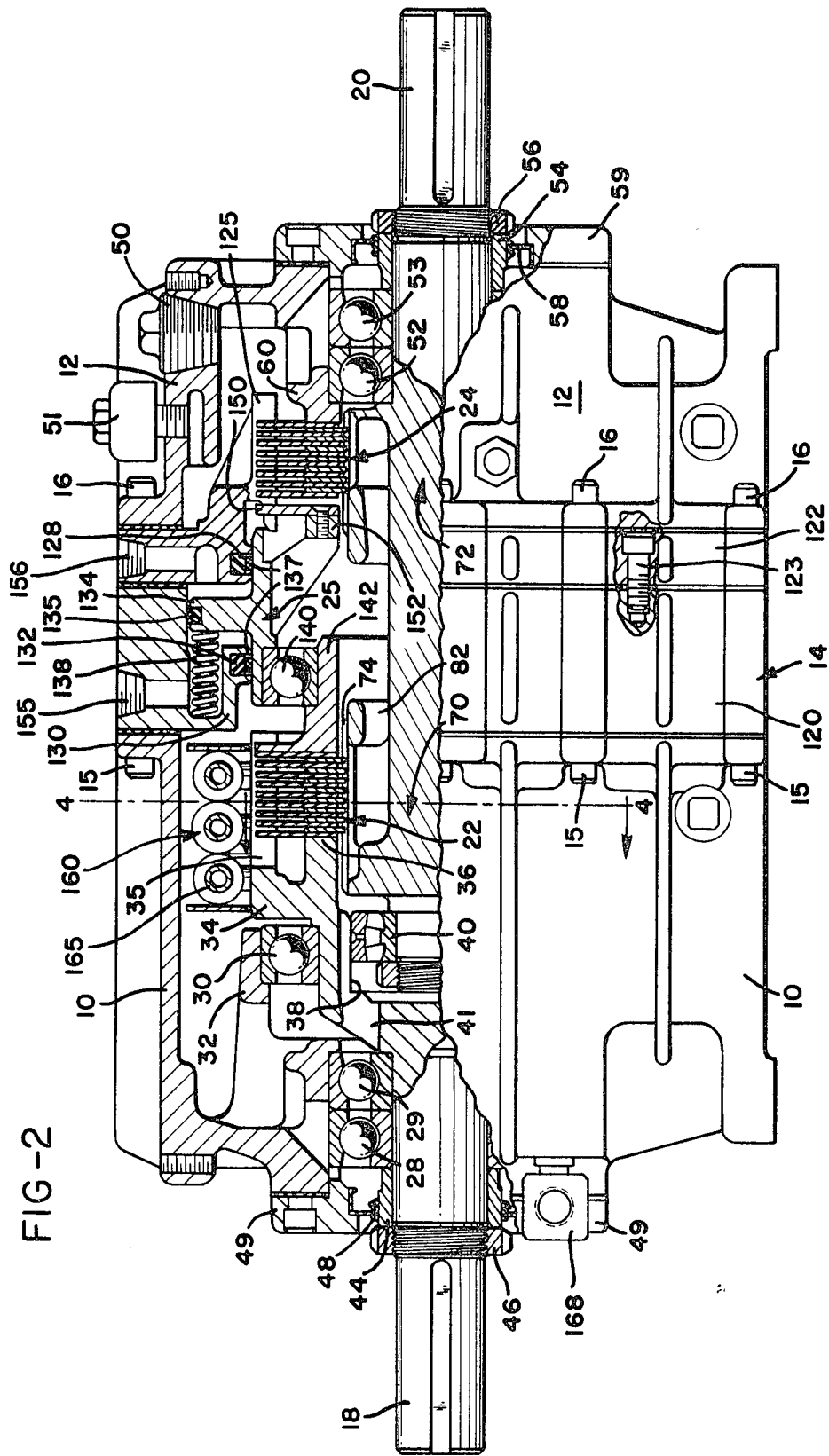
FIG. 2 is an enlarged partial vertical section through the unit of FIG. 1.

A clutch-brake unit is illustrated generally in FIGS. 1 and 2 as including an input housing 10, an axially spaced output housing 12, and an intermediate piston housing 14. The input housing 10 is joined to the piston housing 14 by an annular series of bolts 15 while the output housing 12 is similarly joined to the piston housing 14 by a second annular series of bolts 16.

Figure 3:
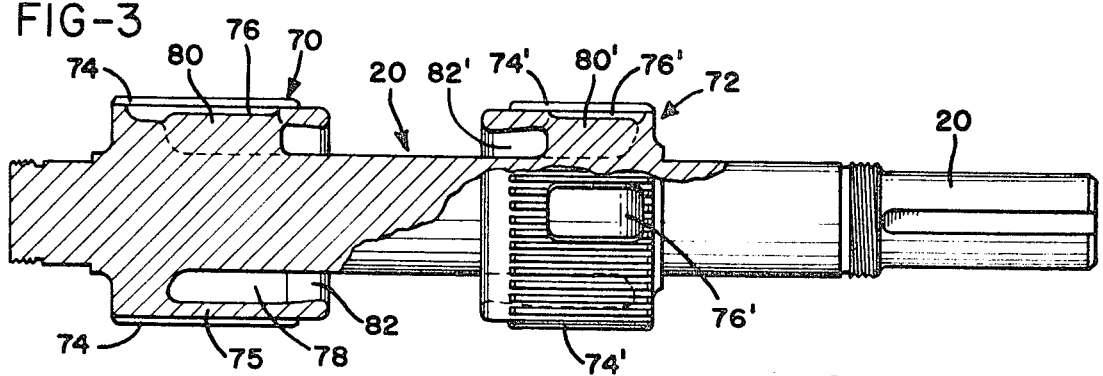
FIG. 3 is a side elevation, partially in section, of the output shaft.

The input housing 10 rotatably supports an input shaft illustrated generally at 18 in FIG. 2, while the output housing 12 rotatably supports the output shaft 20 as shown in FIG. 2 and in greater detail in FIG. 3. The input housing 10 further contains a pack or stack of relatively interfitted drive and driven clutch disks illustrated generally at 22, the construction of which will be covered below in further detail. Further, the output housing 12 incorporates a somewhat similar pack or stack of interfitted disks comprising a brake stack 24. The piston housing 14 incorporates a nonrotating annular piston indicated generally at 25 which is movable in one axial direction to apply a compressive force to the clutch stack 22 for selectively coupling the drive or input shaft 18 to the driven or output shaft 20, and is further movable in the opposite axial direction to apply a compressive or braking force to the brake stack 24 by coupling the output shaft 20 to the housing.

Figure 4:
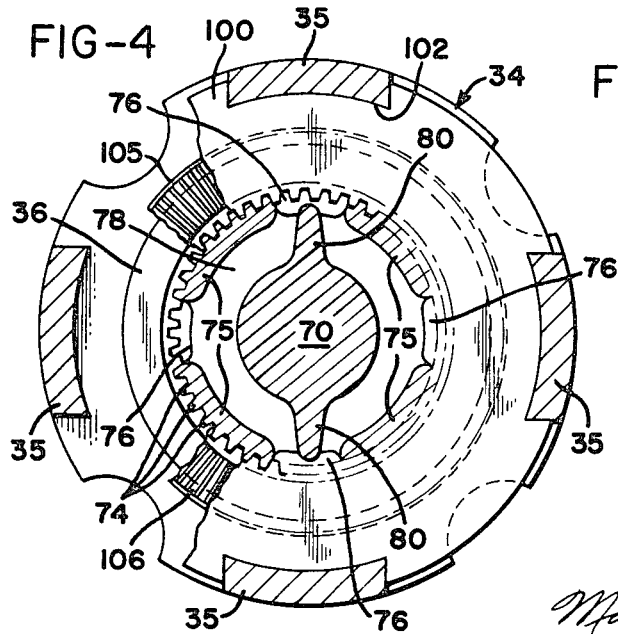
FIG. 4 is a vertical section through the clutch portion taken generally along the line 4—4 of FIG. 2.

Referring first to the details associated primarily with the input housing 10, the input shaft 18 is mounted for rotation on a pair of ball bearings 28, 29, and is piloted on a third bearing 30 supported in a housing web portion 32. The input shaft 18 is provided with an inner enlarged end portion 34 adjacent the bearing 30 which is formed with a series of peripherally spaced drive forks or lugs 35. As shown in FIG. 4 there are four such lugs. These lugs are positioned in overlying relation to the inner end of the output shaft 20 and provide with the output shaft means for supporting the stack 22.

The enlarged end portion 34 is further formed with an annular abutment 36 which defines a reaction surface for the clutch stack 22. A cylindrical inside surface 38 radially inwardly of the bearing 30 provides a seat for the self-aligning bearing 40 supporting the inner end of the output shaft 20. Adjustment of the alignment of this bearing may be had through an access opening 41 in the enlarged portion 38 of the input shaft 18.

Replaceable seal means for the input shaft 18 is provided in the form of a spacer sleeve 44 mounted on the shaft 18 and retained in place by a threaded collar 46. A seal 48 is supported on a removable end cap 49 and runs on the outer surface of the sleeve 44. The seal surface defined by the sleeve 44 can thus be readily replaced, as necessary, without the necessity of removing or refinishing the shaft 18.

Turning now to details of the output housing 12 this housing is formed with an exterior configuration which is generally similar in diameter to that of the input housing 10 and the piston housing 14, all as shown in outline form in FIG. 1. The output housing 12, however, may be provided with an oil fill plug 50 and a vent 51, the plug 50 providing the means by which the combined housings may be partially filled with a heat-dissipating oil.

The output housing 12 rotatably supports the output shaft 20 on a pair of ball bearings 52 and 53, which bearings may be identical with bearings 28 and 29. The output housing also is provided with means defining a removable and readily replaceable seal surface and to this end may include a sleeve 54, and a retaining collar 56 all of which may be identical to the corresponding parts 44 and 46. A seal 58 is retained by the end plate 59 in running engagement with the outer surface of the sleeve 54, and like the sleeve 44, may be readily replaced without the necessity for removing the output shaft 20. The housing 12 incorporates a fixed abutment 60 adjacent the stack 24.

Reference may be had to FIGS. 2, 3 and 4 for further details of the construction of the output shaft 20. Generally, the output shaft 20 is formed with an inner portion 70 associated primarily with the clutch pack 22 and an axially spaced intermediate portion 72 associated primarily with the brake pack 24. These portions, while differing somewhat in construction, are substantially identical in operation and the detailed description which follows is directed particularly to the configuration of the output shaft 20 in the region of the portion 70, it being understood that the portion 72 is similar both in function and in operation.

The portion 70 includes means for drivingly supporting one series of the interfitted plates comprising the stack 22, and for this purpose is formed with a spline 74. As best shown in FIGS. 2 and 4, the spline 74 is formed in four separate arcuate segments of the shaft 20 which define therebetween four openings or slots 76 equally spaced about the shaft. The openings 76 lead directly into an annular space 78 which space is interrupted by a series of impeller vanes 80 formed integrally with the shaft portion 70. The vanes 80 terminate in the regions of the spaces 76 and define an integral vane-type oil pump. When the shaft 20 is rotated the vanes 80 draw oil into the space 78 through an annular inlet opening 82, and force this oil generally radially outwardly through the openings 76 and into the stack 22. When the output shaft 20 is not rotating, the rotation by the input shaft 18 of the alternate disks comprising the stack 22 results in the centrifugal pumping of the oil through the openings 76 generally radially through the stack. In this manner, means are provided in the output shaft for providing a supply of oil radially inwardly of the clutch stack upon initiation of rotation of the output shaft, this oil is supplied under pressure by means of the pump defined by the vanes 80.

As mentioned above, the section 72 of the shaft is similarly formed with openings 76' and vanes 80' to define a second oil pump to deliver a positive supply of oil to the brake stack with rotation of the output shaft 20.

Figure 5:
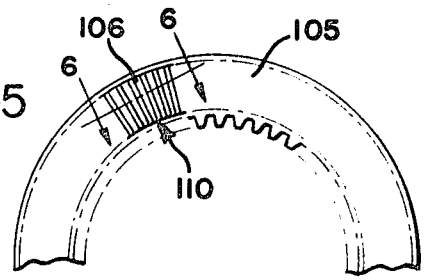
FIG. 5 is a side elevation of one of the driven clutch or brake plates.
Figure 6:
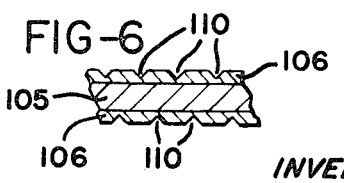
FIG. 6 is an enlarged fragmentary section taken along the line 6—6 of FIG. 5.

Reference may be had to FIGS. 4 and 5 for details of the disks which make up the stacks 22 and 24. The disks of these stacks may be identical in construction and includes an interfitted series of drive plates 100 which are formed with four arcuately spaced keyways 102 for receiving the drive forks or the brake forks as the case may be. Splined interfitting driven plates 105, as shown in FIG. 5, are formed with a bronze surface 106 (FIG. 6) in which are formed a series of relatively closely spaced deep V-shaped radial grooves 110. The grooves 110 provide means for oil to pass freely from the inner to the outer periphery of the stacks 22 and 24 to provide adequate supply of oil so as to maintain a viscous shearing surface during relative rotation and to provide channels through which the heated oil may be removed and a fresh and cool supply of oil added. The grooves 110 permit hydrodynamic pumping to take place, with respect to the clutch stack 22, even in the stalled condition of the output shaft 20 since they provide channels leading directly into the spaces 76 and to the supply of oil provided at these spaces. There is thus no necessity for the oil to flow against centrifugal force to provide lubrication and heat removal from the clutch stack, a condition which is critical during initial engagement and conditions of prolonged or constant slip.

The piston housing 14 is positioned axially between the input and output housings and is formed in two sections, a main section 120 and a second axially aligned section 122 joined by a series of hidden bolts 123 (FIG. 2). The section 122 carries four arcuately spaced brake lugs 125 which are configured similarly to the forks 35 of the input shaft 18, and engage and support the brake plates 100. The housing section 122 also supports an annular seal 128 which engages a cylindrical outer surface of the piston 25.

The housing section 120 is formed with an inwardly extending web 130 supporting a seal 132 in engagement with a second cylindrical outer surface of the piston 25. In order to isolate the opposite sides, the piston is provided with a radially outwardly extending rib 134 which peripherally supports a seal 135 in engagement with an inside cylindrical surface of the housing section 120. Preferably, low friction plastic backing rings 137, such as made of polytetrafluoroethylene are used with the O-ring seals to improve wearing qualities and effectiveness. Springs 138 may be positioned between the piston rib 134 and the housing 14 to bias the piston into the brake-applying position, as shown or, alternatively, such springs may be omitted or may be arranged in opposed relation so as to bias the piston into a neutral position.

The piston 25 is axially supported and centered in relation to the input shaft 18, and is coupled to apply axial compressive force to the stack 22 through a bearing 140 and a clutch plate thrust plate 142. The thrust plate is formed with an outer configuration similarly to that of the plates 100 and is thus keyed onto the forks 35 of the input shaft 18. On the other hand, the piston 25 includes a thrust connection to the brake stack 24 and supports a brake thrust plate 150 on an inwardly formed web portion 152, so that movement of the piston to the right, as viewed in FIG. 2 applies a compressible force to the brake stack 24 applying a stopping or braking force to the output shaft 20, while movement of the piston to the left applies through the thrust bearing 140 and the plate 142 an axially compressible force to the stack 22, resulting in coupling between the input and output shafts.

The housing sections 120 and 122 include means for applying fluid pressure to the opposite sides of the piston 25 for the purpose of control. Thus, the housing section 120 is tapped at 155 to form a fluid pressure inlet to one side of the piston while the housing section 122 is tapped at 156 to form a fluid pressure inlet to the opposite side of the piston. Modulated fluid pressure, such as air, may be applied to the piston 25 selectively to the control coupling, by any suitable air pressure modulating device, and one arrangement which is particularly suitable for use in a variable speed drive is that disclosed and claimed in the copending application of Goodson et al., Ser. No. 808,501, filed Mar. 19, 1969, assigned to the same assignee as this application, now U.S. Pat. No. 3,563,355.

A particular advantage of the invention is the fact that it incorporates a removable liquid-to-liquid heat exchange means for substantially increasing the thermal horsepower of the unit. To this end, a heat exchange assembly is employed as indicated generally at 160 in FIGS. 2, 7 and 8. The assembly 160 includes a pair of end plates 162 and 163 supporting therebetween a coiled and finned tubing 165. One end of the tube 165 is connected to an inlet pipe 166 and the other end is connected to an outlet pipe 167 which extend to fitting on the housing 10. One such fitting is shown at 168 in FIG. 2, it being understood that a second fitting, not shown, may be similarly provided by means of which a cooling liquid, such as water, may be circulated through the tubing 165.

As shown in FIGS. 7 and 8, the tubing 165 is formed in a series of semiarcuate runs for substantially enveloping the clutch pack 22, and thus receives hot oil as it is thrown radially outwardly from the clutch pack and provides for the immediate removal of heat from this oil before the oil falls or flows back into the main quantity of oil in the bottom of the housings.

In lieu of the heat exchange assembly 160, the clutch-brake unit of this invention may be provided with an external air-cooling assembly indicated generally at 170 in FIG. 9. To this end, a U-shaped elongated shroud 172 may be provided in partially encircling relation to, and supported in spaced relation from the housings 10 and 14 by spacer blocks 174 (FIG. 1) defining therebetween an airspace 175 through which air may flow axially of the unit. A cast impeller fan 177 is mounted on the input shaft 18 and rotates within an end bell 178 supported in the inlet end of the housing 172. The air-cooling assembly 170 may thus be added onto the clutch unit as an attachment as a substitute for the unit 160.

The operation of the clutch-brake unit of this invention is largely self-evident from the foregoing description. It is understood that the input shaft 18 is normally run at constant speed, while the output shaft 20 may be accurately controlled in speed from that of the input shaft down to a stopped condition. In fact, quite low r.p.m. may be had simply by modulating the piston 25 between the clutch and the brake position.

The unit has the particular advantage of permissible operation under conditions of prolonged or continuous slip. The integral pump section defined by the output shaft 20 provides a continuous supply of oil to the region between the respective plates of the clutch stack 22, and the radial grooves 110 formed in the plates 105 provide for the continuous movement of oil and accordingly a continuous removal of heat from the region of these plates into the heat exchanger 160. The oil flows radially outwardly through the stack 22 even when the output shaft is stopped by reason of the centrifugal pumping action of the moving plates 100 and the openings 76 in the shaft 20 which provides a continuous supply of oil.

The brake section 24 also has high thermal capacity since it is provided with an integral output shaft pump section and radial oil passageways in the plates in the manner described in connection with the clutch stack 22. However, since the brake section is normally not operated under conditions of constant slippage, special provision for removing heat at that location is not required.

The nonrotating double-acting piston 25 is one which has a fast response time with the fewest number of rotating parts. Thus, the integrity of the seals may be maintained over a long period of use.

The provision of the housing sections 120 and 122 permit the assembly of the housing 14 in a clean room or otherwise in a controlled environment, and then stored until needed. The brake and clutch plate assemblies may be changed, as desired, merely by the removal of the housing section involved, providing ready access to these plates without the necessity of disassembling the piston from its associated housing.

The arrangement of the operating piston 25 axially between the disk stacks 22 and 24 provide certain unique advantages. In the first place, the provision of the piston 25 in the intermediate housing section 14 permits the use of short radial fluid passages leading directly to the piston chamber. The absence of long lead in passages permits substantially higher response rates than possible in systems in which long lead passages are employed. This is particularly important where the piston 25 is pneumatically operated.

A further advantage resides in the fact that the undesirable characteristic wear pattern of the disks in a multiple disk pack is substantially corrected by the arrangement of the present invention. It is well recognized that, other factors being equal, the disks in a multiple disk pack nearest the end where the clamping force is applied are subject to the greatest rate of wear. This is due primarily to the fact that the force required to overcome the spline friction in collapsing the stack is applied through these first few disks. In the present invention, the disks which would normally be subject to the highest rate of wear are those which are nearest the inlets 82 and 82' of the integral pumps and are accordingly at the region of greatest fluid pressure. However, these disks are in fact protected from excess wear and the wear curve is normalized due to the fact that the higher oil pressure increases the rate of flow through these disks. This condition is true for both the clutch and the disk stacks. Further, the impeller design associated with the output shaft not only assures a positive supply of oil to the disk stacks, but it also assures circulation of oil through the entire clutch-brake unit thus providing positive circulation to the bearings and the oil seals, and preventing localized hot spots.

The employment of the heat exchange assembly 160 permits installation of such units in the field for increasing the thermal capacity as desired. Similarly, the air-cooling assembly 170 may also be added in the field. Maintenance of the oil seals 48 and 58 may readily be effected in the field, and the sleeve 44 or 54 replaced without the necessity or refinishing the shafts or tearing down the unit. Access to the bearings 28 and 29 may be added through the end plate 49 and access to the bearings 52 and 53 may be had through the end plate 59, again without tearing down the unit.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In clutch-brake unit including a housing for containing a supply of oil, a drive shaft rotatably supported within one end of said housing, an output shaft rotatably supported within the other end of said housing and extending generally in axial alignment with said drive shaft, a first series of interfitting angular plates within said housing and including drive plates mounted on said drive shaft for rotation therewith and interfitting driven clutch plates mounted in driving relation to said output shaft, a second series of interfitting annular plates positioned in axially spaced relation to said first plate series, said second plate series including driven plates mounted on said output shaft and interfitting brake plates supported by said housing, an actuating piston positioned axially between said first and second plate series, means supporting said piston for axial movement, and thrust means connected to said piston for applying an axially compressive force to said first plate series in response to movement of said piston in one axial direction to couple said output shaft with said drive shaft and for applying an axially compressive force to said second plate series in response to movement of said piston in the other axial direction for braking said output shaft to said housing, the improvement comprising, means for preventing rotation of said piston, a first oil pump impeller on said output shaft and including vane means located within said first plate series for supplying oil under pressure to said first plate series upon rotation of said output shaft, a second oil pump impeller on said output shaft and including vane means located within second plate series for supplying oil under pressure to said second plate series upon rotation of said output shaft, and said impellers include axially opposing inlets for receiving the oil within said housing.

2. A clutch-brake unit as defined in claim 1 wherein both of said impellers are integrally formed with said output shaft to minimize the inertia of said output shaft.

3. A clutch-brake unit as defined in claim 1 wherein said vane means of said first and second impellers each comprise at least one substantially radial vane extending in an axial plane and effective to pump oil through the corresponding said plate series in response to either direction of rotation of said output shaft.

4. The clutch-brake unit as defined in claim 1 and further including a heat exchanger within said inlet housing and having tubing positioned radially outwardly of and generally surrounding said first plate series to remove heat from oil thrown outwardly therefrom before the oil returns to the supply in said housing for said impellers.

5. The clutch-brake unit as defined in claim 1 and further comprising spring means for urging said piston to a predetermined position within said housing.

6. In clutch-brake unit including a housing for containing a supply of oil, a drive shaft rotatably supported within one end of said housing, an output shaft rotatably supported within the other end of said housing and extending generally in axial alignment with said drive shaft, a first series of interfitting annular plates within said housing and including drive plates mounted on said drive shaft for rotation therewith and interfitting driven clutch plates mounted in driving relation to said output shaft, a second series of interfitting annular plates positioned in axially spaced relation to said first plate series, said second plate series including driven plates mounted on said output shaft and interfitting brake plates supported by said housing, an actuating piston positioned axially between said first and second plate series, means supporting said piston for axial movement, and thrust means connected to said piston for applying an axially compressive force to said first plate series in response to movement of said piston in one axial direction to couple said output shaft with said drive shaft and for applying an axially compressive force to said second plate series in response to movement of said piston in the other axial direction for braking said output shaft to said housing, the improvement comprising a heat exchanger within said housing and including tubing positioned radially outwardly of and generally surrounding said first plate series to remove heat from oil thrown outwardly from said first plate series before the oil returns to the supply in said housing for said impellers.

7. In clutch-brake unit including a housing for containing a supply of oil, a drive shaft rotatably supported within one end of said housing, an output shaft rotatably supported within the other end of said housing and extending generally in axial alignment with said drive shaft, a first series of interfitting annular plates within said housing and including drive plates mounted on said drive shaft for rotation therewith and interfitting driven clutch plates mounted in driving relation to said output shaft, a second series of interfitting annular plates positioned in axially spaced relation to said first plate series, said second plate series including driven plates mounted on said output shaft and interfitting brake plates supported by said housing, an actuating piston positioned axially between said first and second plate series, means supporting said piston for axial movement, and thrust means connected to said piston for applying an axially compressive force to said first plate series in response to movement of said piston in one axial direction to couple said output shaft with said drive shaft and for applying an axially compressive force to said second plate series in response to movement of said piston in the other axial direction for braking said output shaft to said housing, the improvement wherein said housing includes an inlet housing portion supporting said drive shaft, an outlet housing portion supporting said output shaft, an intermediate housing portion sandwiched between said inlet and outlet housing portions and including a first annular section and a second annular section confining said piston therebetween, means for securing said housing portions together, means in said intermediate housing portion defining at least one fluid passageway for actuating said piston, and means for connecting said first and second sections of said intermediate housing portion to provide a subassembly which may be assembled separately from the assembly of said inlet and outlet housing portions to said intermediate housing portions.

8. The unit of claim 1 further comprising a liquid-to-liquid heat exchanger removably received in said housing in essentially surrounding relation to said first plate series for removing heat from oil thrown radially therefrom before such oil is returned to the supply in said housing.

9. The unit of claim 8 in which said heat exchanger comprises a finned tubing.

* * * * *